T. A. WILLSON & G. W. MEIGS,

Assignors to said T. A. WILLSON.

Spectacles.

No. 9,241. Reissued June 8, 1880.

WITNESSES

H. L. Fulenwider.

Henry Howson Jr

INVENTORS

Thomas A Willson.
and
George W. Meigs.
by their Attorneys
Howson & Son

N. PETERS, PHOTO-LITHOGRAPHER, WASHINGTON, D. C.

UNITED STATES PATENT OFFICE.

THOMAS A. WILLSON AND GEORGE W. MEIGS, OF READING, PENNSYLVANIA, ASSIGNORS TO SAID THOMAS A. WILLSON.

SPECTACLES.

SPECIFICATION forming part of Reissued Letters Patent No. 9,241, dated June 8, 1880.

Original No. 215,420, dated May 13, 1879. Application for reissue filed May 12, 1880.

*To all whom it may concern:*

Be it known that we, THOMAS A. WILLSON and GEORGE W. MEIGS, both citizens of the United States, and both residing in Reading, Berks county, Pennsylvania, have invented certain Improvements in Spectacles, of which the following is a specification.

Our invention relates to certain improvements in the end pieces and temples of spectacles, the main objects of the invention being to simplify and cheapen the construction of these parts and to protect and strengthen the temple-eye, in the manner which we will proceed to describe, reference being had to the accompanying drawings, in which—

Figure 1:
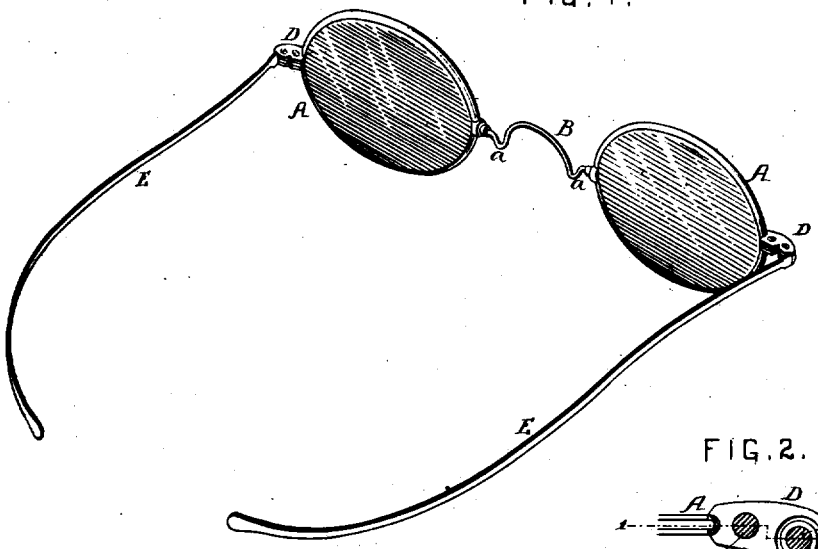
Figure 2:
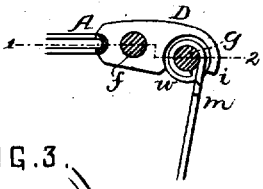
Figure 3:
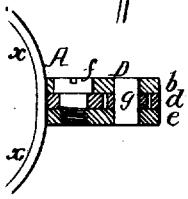
Figure 4:
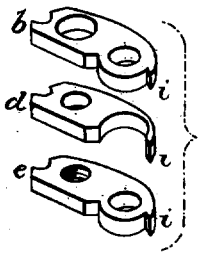
Figure 5:
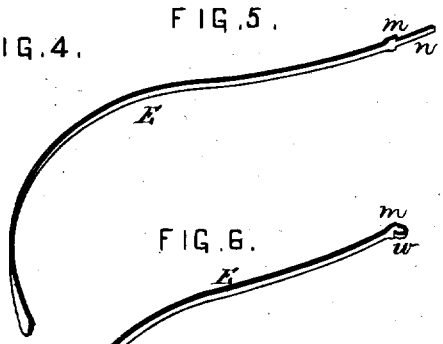
Figure 6:
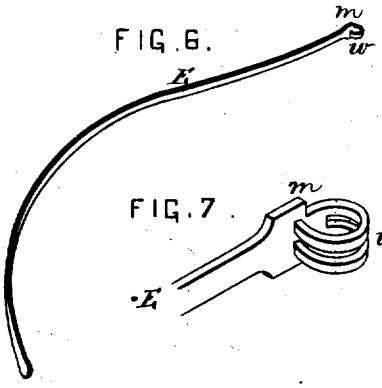

Figure 1 is a perspective view of a pair of spectacles with our improvements; Fig. 2, a sectional plan view of one of the end pieces drawn to an enlarged scale; Fig. 3, a vertical section of the end piece on the line 1 2, Fig. 2. Fig. 4, a perspective view, showing detached parts of which the end piece is composed; Figs. 5 and 6, perspective views, showing the manner of constructing the temple; and Fig. 7, a perspective view of a modification.

A A are the eye-frames, B the nose-piece, D D the end pieces, and E E the temples.

The opposite ends of the wire forming the nose-piece are connected to the inner portions of the eye-frames at the centers of the same; but between the central bridge of the nose-piece and the points of connection the wire is bent down at the two points *a a*, Fig. 1, in a direction at right angles, or thereabout, to the central horizontal line of the eye-frame, so that the spectacles will be higher on the nose than usual—an arrangement which brings the lenses in the best position in respect to the eye without resorting to the usual plan of attaching the ends of the nose-piece to the eye-frames at a point below the centers of the same, which detracts from the symmetry of the spectacles.

The end pieces, D, instead of being made of two parts, as usual, are each composed of three plates, *b*, *d*, and *e*. (Shown in the perspective view, Fig. 4.)

When the end piece is made of two parts it is necessary to counterbore the inner face of each piece, so as to form in the same an opening, part of which is of a diameter large enough to receive the eye of the temple, the remainder of the opening being adapted to receive the end of the pin by which the temple is pivoted. It is also necessary in this case to counterbore the upper face of the top half of the end piece for the reception of the head and part of the stem of the binding-screw *f*.

By making the end piece of three pieces these tedious and costly boring operations are dispensed with, as the necessary openings can all be made by means of simple punching-tools. In Fig. 4, for instance, the upper plate, *b*, has two plain openings—one for the pivot-pin and one for the head of the screw *f*—the plate *d* has an opening for the stem of the screw and a recess for the eye of the temple, and the plate *e* has an opening for the end of the pivot-pin and a threaded opening for the reception of the threaded end of the stem of the binding-screw.

In fitting the parts together the plates *b* and *d* are united by brazing and secured to the upper half, *x*, of the eye-frame A, and the lower plate, *e*, is secured to the lower half, *x'*, of said frame, the eye of the temple being adapted to the slot in the plate *d* and to the pivot-pin *g*, and being held in place by the plates *b* and *e* when the binding-screw *f* is inserted.

Each of the plates *b*, *d*, and *e* is notched at one end for the reception of the frame A, and each plate has a projection, *i*, which, when the plates are secured together, form the stop for the temple.

Instead of the plates being secured together by the binding-screw *f*, however, the latter may be dispensed with, and the three plates may be permanently secured together by brazing, the pivot-pin in this case being removed when it is desired to detach the temple.

Each temple E is punched out of a plate of steel or other suitable metal, the blank being first made in the form shown in Fig. 5, with the usual enlarged outer end, an enlargement, *m*, being formed near the opposite end where there is a projecting tongue, *n*, which, in order to complete the temple, is bent to the condition shown in Fig. 6, the bent end, however, being unsecured, so that the eye *w* may be elastic and embrace the pivot-pin so tightly that it will always tend to retain the temple in any position to which it may be adjusted, the effects of wear being compensated for by the elasticity of the eye, and this elasticity preventing the joint from working loose. The end of the enlargement *m*, by coming in contact with the projections *i* of the plates composing the end piece, serves as an additional stop for the temple.

Figure 7:
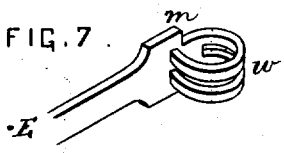

The elastic eye need not necessarily be formed by bending around the end of the temple without securing the bent end. For instance, the said bent end may be secured to the body of the temple by brazing or otherwise, and the proper elasticity attained by slotting horizontally the eye thus made, as shown in Fig. 7, forming two elastic parts which do not bind upon the pin *g*, but upon the top and bottom plates of the end piece. The pin *g* in this case serves merely to prevent lateral or longitudinal displacement of the temple.

A temple may be constructed much more rapidly and cheaply in this way than if the eye is forged upon the end of the strip.

It will be observed that the abutment *i*, instead of being arranged in line longitudinally with the center of the pivot *g*, is extended beyond said pivot, as shown in Fig. 2, so as to protect the eye of the temple and impart additional strength to the said eye and to the end piece.

We claim as our invention—

1. The combination of the end piece, D, and its pin *g* with a temple having an elastic eye, *w*, substantially as specified.

2. The combination of a temple having an enlargement, *m*, with an end piece having an abutment, *i*, extending beyond a longitudinal line drawn through the center of the pivot, as specified.

3. The within-described end piece, composed of three plates, *b*, *d*, and *e*, constructed and arranged substantially as set forth.

4. The combination of the pivot-pin *g* and a temple having a bent end, forming an eye, with an end piece having an abutment, *i*, extending beyond the longitudinal line drawn through the center of the pivot, as specified.

In testimony whereof we have signed our names to this specification in the presence of two subscribing witnesses.

THOMAS A. WILLSON.
GEORGE W. MEIGS.

Witnesses:
MARTIN L. MILLER,
WM. W. ESSICK.